United States Patent [19]

Tsuyama

[11] Patent Number: 4,775,145

[45] Date of Patent: Oct. 4, 1988

[54] LOAD APPLYING MEANS FOR AN EXERCISE DEVICE

[75] Inventor: Sadaharu Tsuyama, Osaka, Japan

[73] Assignee: Tsuyama Mfg. Company, Ltd., Japan

[21] Appl. No.: 773,349

[22] Filed: Sep. 6, 1985

[30] Foreign Application Priority Data

Feb. 2, 1985 [JP] Japan .................................. 60-28780

[51] Int. Cl.[4] ........................ A63B 21/24; A63B 21/00
[52] U.S. Cl. ....................................... 272/73; 272/129; 272/DIG. 6
[58] Field of Search .................. 272/73, DIG. 5, 129, 272/DIG. 6; 310/93, 94, 268, 105, 95, 178

[56] References Cited

U.S. PATENT DOCUMENTS

| | | | |
|---|---|---|---|
| 2,218,859 | 10/1940 | Schweitzer | 310/94 |
| 2,784,591 | 3/1957 | Shoor | 272/73 |
| 3,442,131 | 5/1969 | Leyten | 272/73 |
| 3,505,992 | 4/1970 | Jaeger | 272/73 |
| 3,624,438 | 11/1971 | Hoyler | 310/93 |
| 4,060,239 | 11/1977 | Pfleiderer et al. | 272/129 |
| 4,203,046 | 5/1980 | Homann et al. | 310/94 |

FOREIGN PATENT DOCUMENTS

| | | | |
|---|---|---|---|
| 1500390 | 9/1967 | France | 272/129 |
| 120015 | 8/1970 | Norway | 272/73 |
| 345958 | 9/1972 | Sweden | 272/73 |
| 1279201 | 6/1972 | United Kingdom | 272/73 |

Primary Examiner—Richard J. Apley
Assistant Examiner—S. R. Crow
Attorney, Agent, or Firm—Allegretti & Witcoff, Ltd.

[57] ABSTRACT

A load applying device for an exercise device for applying a load to a shaft rotating at a speed higher than a predetermined speed comprising a frame rotatably supporting the shaft, means operated by the user for rotating said shaft, and rotated therewith and an electromagnet disposed adjacent the rotating disc and cooperating therewith so that magnetic flux traversing the surfaces of the rotating disc is generated to apply brake torque to the rotating disc. Preferably, the electromagnet comprises a main body with a core and an exciting body wound on the core, and control means for controlling the current applied to the exciting coil. The load applying device includes speed increasing mechanism which may comprise a first stage motion transmitting chain and gear mechanism and a second stage belt and rotating body mechanism.

14 Claims, 4 Drawing Sheets

LOAD APPLYING MEANS FOR AN EXERCISE DEVICE

BACKGROUND OF THE INVENTION

The present invention relates to a device for applying load to a rotating shaft. Particularly, the present invention relates to an improvement of a device for applying load to a rotating shaft not mechanically but magnetically.

A device of this invention can be used for example as a load applying device for various motors or as a load applying device for an ergometer and the like.

It is necessary for a load applying device to apply continually an arbitrary load (brake torque) to a rotating shaft of an apparatus which receives the load. Therefore an excellent durability is required for such a load applying device.

Such a load applying device in the prior art will be described in the following, by taking an example of a load applying device used in an ergometer.

The Japanese patent Publication Gazette No. 8267/1983 discloses an example of the prior art concerning a total structure of a training apparatus of the pedal type including a load applying device (a training apparatus of this type being referred to in this specification as an "ergometer"). As described in the above stated gazette, the load applying device of an ergometer is generally of the system in which the magnetic field of an exciting coil generates eddy current in an object such as an eddy current plate to which brake torque is to be applied (this system being referred to hereinafter as the "eddy current system"). This system is advantageous in that little friction is caused in the apparatus and control can be made relatively easily, as compared with a system in which brake torque is applied by mechanical friction force.

The Japanese Utility Model Laying-Open Gazette No. 166058/1981 discloses a brake device (a load applying device) of an ergometer where an exciting coil is provided on one of the side surfaces of a rotating disc to which brake torque is applied.

The Japanese Utility Model Publication Gazette No. 8509/1972 shows an example of a heat radiation structure in a load applying device of the eddy current system.

One of the important conditions required for a load applying device is that load to be applied to an object, namely, brake torque can be set to an arbitrary fixed value, irrespective of the rotation speed of the object.

One reason for this is that in the case of an ergometer, for example, calculation of the kinetic amount of a person exercising using the ergometer cannot be made correctly, as desired, if the brake torque of a load applying device changes dependent on the rotation speed of the pedals, thus making the ergometer perform its function unsatisfactorily.

Another reason is that the brake torque applied by a load applying device can be generally utilized for many purposes if it can be set freely to an arbitrary fixed value independently of the rotation speed of an object to which the torque is applied.

None of the above stated conventional load applying devices of the eddy current system satisfy the aforesaid condition, all of them involving a disadvantage that if the speed of stepping on the pedals, namely, the rotation speed of the crankshaft changes, the applied brake torque also changes irregularly.

In addition, the devices of the later two gazettes mentioned above involve another disadvantage that a structure for forming a magnetic path becomes complicated.

The present invention pertains to a device for applying load to a load shaft rotating at a speed higher than a prescribed rotating speed, comprising:

a rotating disc coupled to said load shaft so as to be rotated, and an electromagnet disposed in a position where main surfaces of said rotating disc are inserted in said eletromagnet but are not in contact therewith, so that magnetic flux traversing the surfaces of said rotating disc is generated to apply brake torque to said rotating disc.

If the present invention is applied in an ergometer as a preferred embodiment, the invention further comprises:

a crankshaft having pedals, and a speed increasing mechanism provided in association with said crankshaft and said load shaft for increasing the rotation speed of the crankshaft to transmit the increased rotation speed to the load shaft, a speed increase ratio at the time of transmission being selected so that the rotation speed of the load shaft may be higher than the above stated prescribed rotation speed with the rotation speed of the crankshaft being in the range of practically applicable speed.

Since a closed magnetic path is formed by the rotating disc and the electromagnet facing both sides of the rotating disc, eddy current is generated efficiently in the rotating disc.

Further, since the rotation speed of the load shaft is set to a value higher than a prescribed rotation speed, brake torque applied to the rotating disc by the eddy current generated in the disc functions in a saturated region. Therefore, stable brake torque is applied irrespective of the rotation speed of the load shaft.

In the case of a preferred embodiment of the invention adopted in an ergometer, the rotation speed of the load shaft is maintained at a value higher than the above stated prescribed speed by the speed increasing mechanism and accordingly, brake torque is stably applied.

BRIEF DESCRIPTION OF THE DRAWINGS

There is shown in the attached drawing a presently preferred embodiment of the invention wherein like numerals in the various views refer to like elements and wherein.

DETAILED DESCRIPTION OF THE PRESENT INVENTION

In the following, a concrete embodiment of the present invention will be described in detail with reference to the drawings, taking an example of a load applying device used in an ergometer.

Figure 2:
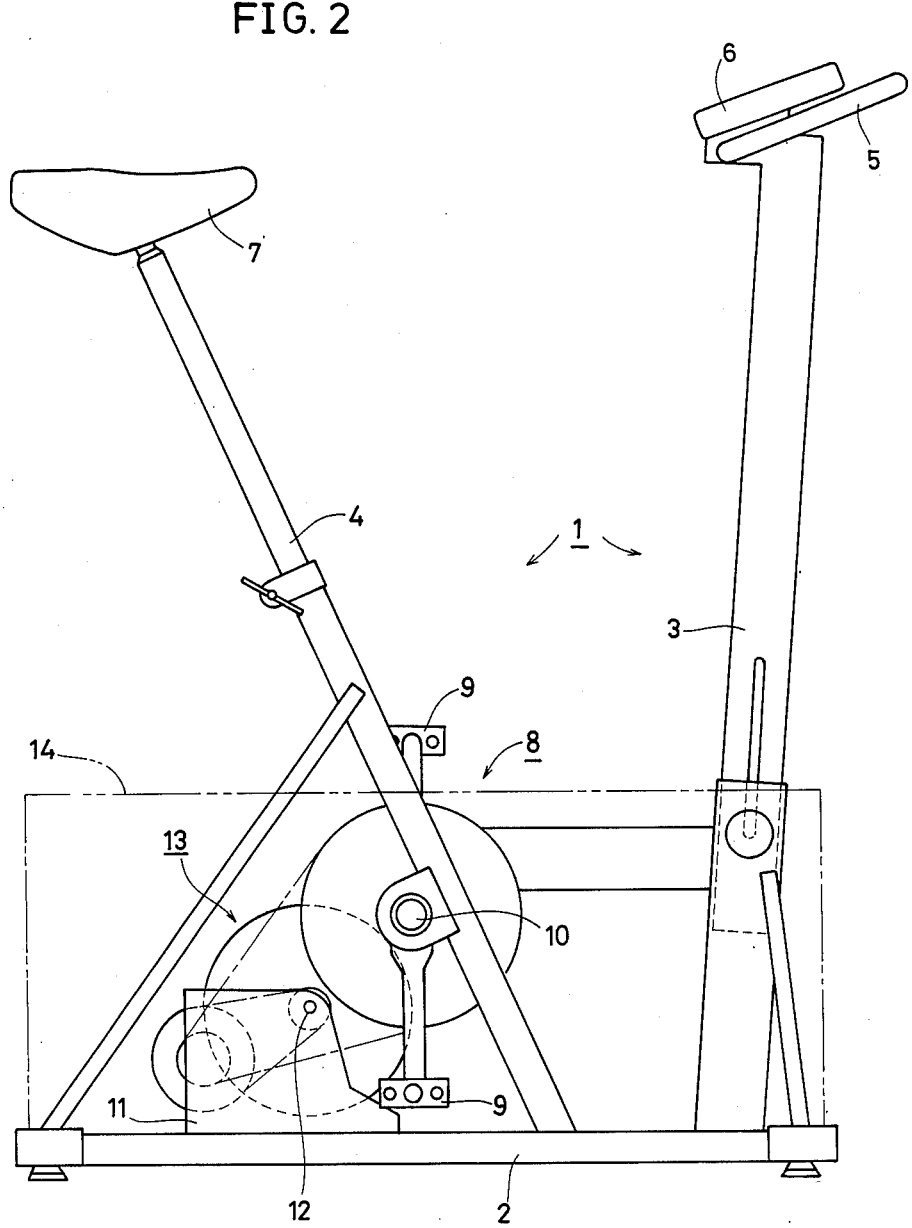
FIG. 2 is a side view showing a total structure of an ergometer in which an embodiment of the present invention is adopted.

FIG. 2 is a side view showing a total structure of an ergometer embodying of the presesnt invention. A frame 1 made of a construction material such as steel tubing or frame material, comprises at least a base 2 and a front and a back stays 3 and 4, both having variable height. An upper end of the front stay 3 comprises a handle 5 having a loop shape as a plane figure for example and a control panel 6. The control panel 6 is provided with a keyboard for regulating brake torque and the like to be applied to the load shaft, a display for displaying the running distance and other components, as described later. An upper end of the back stay 4 comprises a saddle 7. On the base 2, a load applying device 8 is provided.

The load applying device 8 comprises a crankshaft 10 attached to the back stay 4 having pedals 9 and a load shaft 12 supported by a support frame 11 on the base 2. The crankshaft 10 and load shaft 12 are coupled by a speed increasing mechanism 13 having two speed increase stages. The construction of the load applying device 8 excluding the pedals is usually protected by a cover 14 shown by the chained line for the purpose of preventing clothes etc. of a user from being caught in the device or for the purpose of protection from dust.

Figure 1:
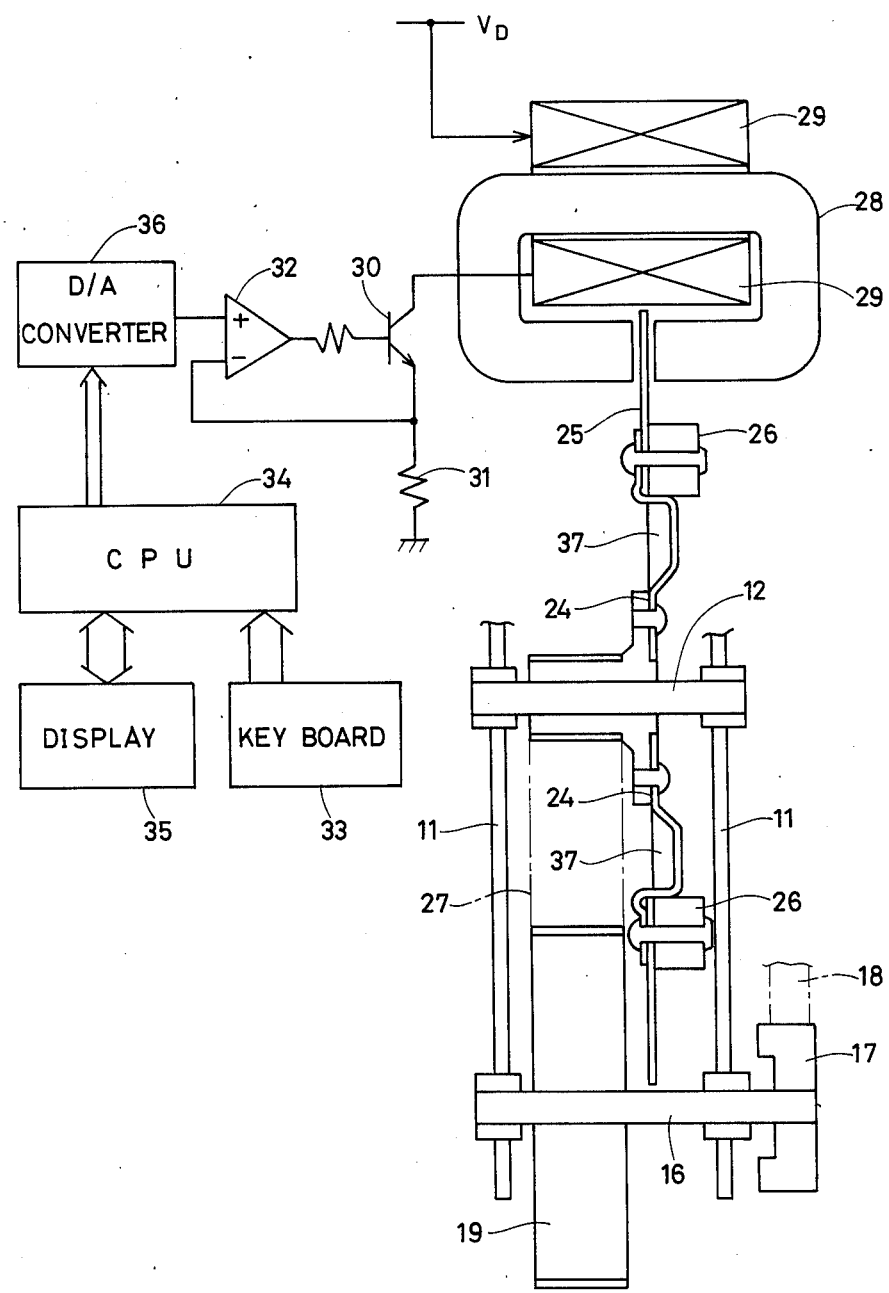
FIG. 1 is a structural view showing an essential part of an embodiment of the present invention.
Figure 3:
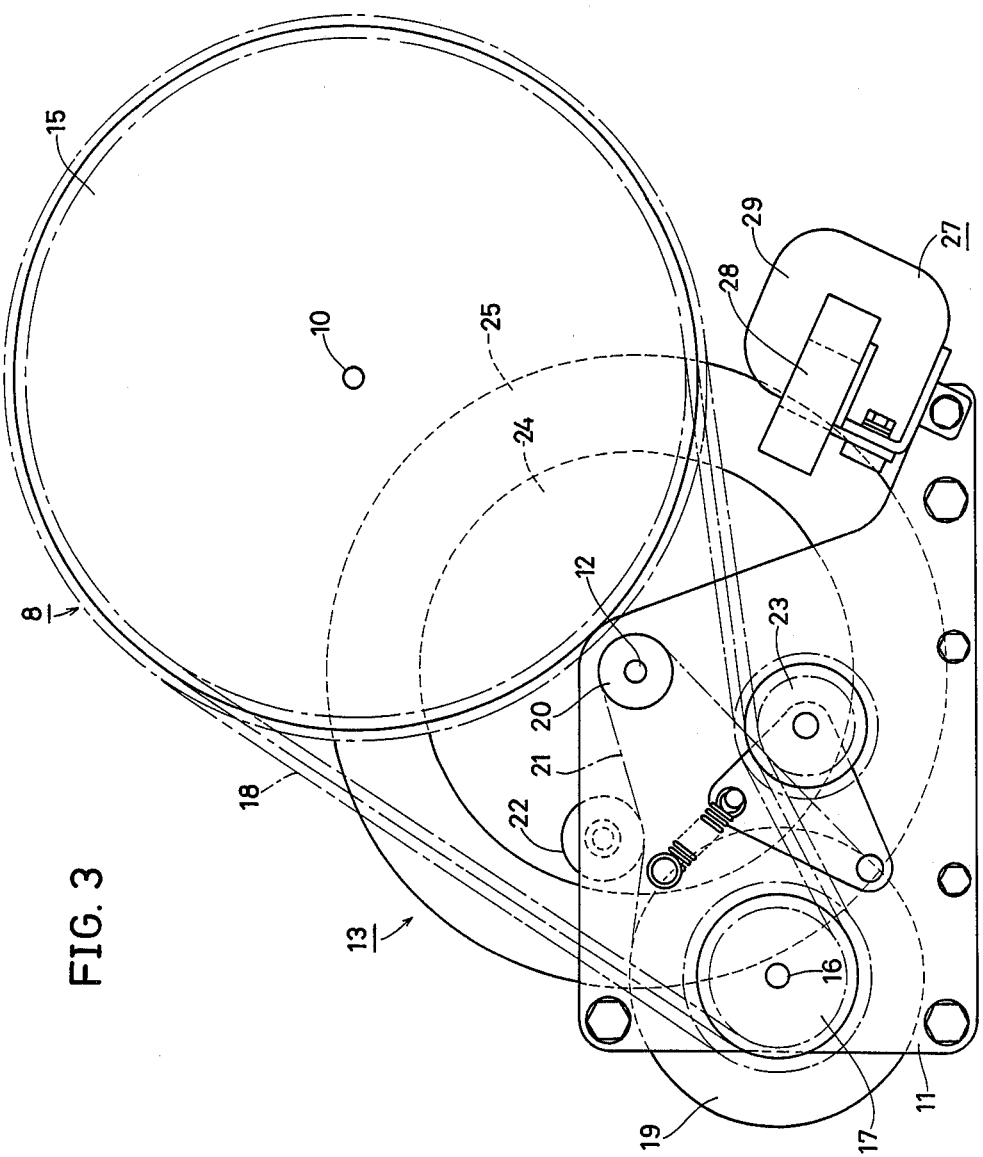
FIG. 3 is a detailed view of a load applying device in FIG. 2.

FIG. 1 and 3 are views showing an essential part of the load applying device 8. First referring to FIG. 3, the speed increasing mechanism 13 comprises: a first speed increase stage including a crank wheel 15 of a large diameter fixed to the crankshaft 10, a wheel 17 of a small diameter fixed to an intermediate shaft 16 rotatably held by the support frame 11 and a chain 18 set on the two wheels; and a second speed increase stage including a pulley 19 of a large diameter fixed to the intermediate shaft 16, a pulley 20 of a small diameter fixed to the load shaft 12 and a timing belt 21 set on the two pulleys. Thus, the speed increasing mechanism is so structured that a speed increase ratio of the mechanism 13, namely a speed increase ratio between the crankshaft 10 and the load shaft 12 can be set to a large value. In FIG. 3, the reference numeral 22 indicates a tension pulley for tightening the timing belt 21 and the reference numeral 23 indicates a derailleur for tightening the chain 18. In this embodiment, the speed increase ratio is set to 16.6/1.

Although in this embodiment, the speed increasing mechanism 13 is structured by the wheels and the chain set therebetween, as well as by the pulleys and the timing belt set therebetween, it may be structured by a combination of only the wheels and the chains or only the pulleys and the timing belts. In addition, the speed increasing mechanism 13 may be structured by a combination of gears.

Further, the speed increasing mechanism 13 may be structured with any number of speed increase stages, say, a single stage or three or more stages, the number being not limited to two as mentioned above, insofar as the rotation speed of the crankshaft 10 is increased and transmitted to the load shaft 12 and the rotation speed of the load shaft 12 can be made higher than a prescribed rotation speed (an example of a concrete value thereof being mentioned later) with the rotation speed of the crankshaft 10 being in the range of a practically applicable speed (an example of a concrete value thereof being mentioned later).

Now referring to FIGS. 1 and 3, around a wheel 24 fixed to the load shaft 12, a circular disk 25 made of a copper plate for example is fixed so that the disk 25 and the wheel 24 form one body to have an increased diameter. In addition, in order to make smooth the rotation of the disk 25 and the rotation of the wheel 24, a circular weight ring 26 functioning as a fly wheel is attached for example in a portion of coupling between the wheel 24 and the disk 25. As a result, the disk 25 and the load shaft 12 can rotate smoothly and the structure can be made simpler than in the case of providing a fly wheel for that purpose.

In association with the disk 25, a single electromagnet 27 is provided in a manner fixed to the support frame 11. The electromagnet 27 comprises a core 28 and an exciting coil 29 wound onto the core 28 on a coil bobbin (not shown). The core 28 in this embodiment has the form of the letter C opened at one point so that the two main surfaces of the disc 25 are interposed in the opening between the end surfaces of the core, but are not in touch or contact with the end surfaces.

Core 28 is preferably a cut core having a single cut on multiple turns of a band steel. This is because a cut core, even if of a small size, has a high density of magnetic flux and is capable of generating a larger quantity of eddy current in the disc 25 as compared with a ordinary multi-layer core and accordingly the brake torque applied to the disc 25 can be substantially increased.

Although in this embodiment, only one electromagnet 27 is used, it goes without saying that a structure having two or more electromagnets may be adopted in cases where more intense brake torque is required.

The structure of the electromagnet 27 is not limited to that in this embodiment. For example, the following structure may be adopted. A set of two electromagnets each comprising a column-like core and an exciting coil wound on the core may be used so that the electromagnets may be disposed on both sides of the disc 25. In sum, as both surfaces of the disc 25 are placed in an intermediate space provided in one or more electromagnets in the state where the surfaces of the disc 25 are not in contact with the electromagnets, any form or any structure may be adopted for the electromagnets.

One end of the exciting coil 29 is connected to a DC power source $V_D$ and the other end thereof is grounded through a control transistor 30 and a resistor 31. To the base of the control transistor 30, an output of a comparator 32 is supplied. Control transistor 30, control resistor 31 and comparator 32 form a current control circuit, whereby the set current is made to flow in the exciting coil 29.

Setting of the current flowing in the exciting coil 29 is made in the below described manner by means of a keyboard 33, a central processing unit (CPU) 34, a display 35 and a digital to analog (D/A) converter 36 provided in the control panel 6 (see FIG. 2). The user enters desired brake torque (namely, load of the ergometer according to his own physical strength) by means of the keyboard 33. The entered brake torque is displayed on the display 35 through the CPU 34 to be ascertained by the user. When the brake torque is determined, the CPU 34 calculates exciting current necessary for applying the brake torque. This calculation of the exciting current value is performed based on the relation:

$$\text{brake torque} = k_2 + f(I)$$

where $k_2$ is a prescribed load value independent of current and $f(I)$ is a load value changing dependent on current. Then, the CPU 34 applies a control signal to the comparator 32 through the D/A converter 36 so that the calculated current may flow in the exciting coil 28.

Preferably, the CPU 34 has a further function of calculating the kinetic amount of the user so that the kinetic amount is represented on the display 35.

Figure 4:
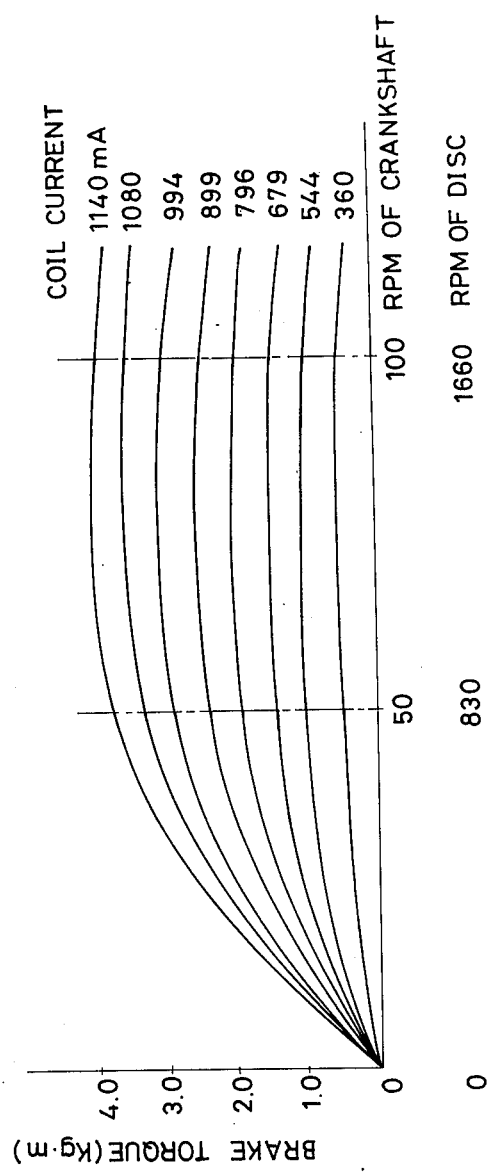
FIG. 4 is a graph showing eddy current load characteristics of an embodiment of the present invention.

An example of the eddy current load characteristics in a relation between the disc 25 and the exciting coil 28 is shown in FIG. 4. The characteristic curve in FIG. 4 is obtained as a result of measurement under the conditions set as follows:

Number of turns of the exciting oil: 1000 t
Opening or gap between the opposed end surfaces of the C shaped core: 1.7 mm
Thickness t of the disc: 1.0 mm
Diameter D of the disc: 215 mm
Speed increase ratio: 16.6/1
Surface temperature of the disc at the time of measurement: 15° to 18° C.

In this embodiment, the number of revolutions per minute of the crankshaft 10 is in the range of 50 to 100 as a practically applicable range in the ergometer and the speed increase ratio of the speed increasing mechanism 13 is set to 16.6 as previously described so that the number of revolutions per minutes of the load shaft 12, namely, that of the disc 25 may be in the range of 830 to 1660 with the number or revolutions per minute of the crankshaft rotation being in the above stated range. Thus, by setting the speed of the load shaft 12 to a value higher than the prescribed rotation speed, the brake torque applied to the disc 25 can be made almost stable as is clear from FIG. 4. This is because, with the revolution speed of the disc 25 higher than a prescribed value, generated eddy current can be utilized in a saturated region and influence by the rotation speed of the disc 25 as in the non-saturated region (in the region of the rotation speed of the disc lower than 830 rpm in FIG. 4) can be avoided.

Accordingly, in this embodiment, brake torque can be set to an arbitrary fixed value by making regulation finely or without grades in the range of the rotation speed of the disc 25 of 830 to 1660 rpm, in other words, in the range for practically using the pedals. Thus, the kinetic amount of the user can easily be calculated.

Further, in this embodiment, a plurality of sheets of fins 37 are formed in positions on the main surface of the disc 25, not interfering with the electromagnet 27, namely, on the main surface of the disc near the circumference of the wheel 24. The fins 37 may be formed radially in circles on the main surface of the disc 25 each in a curved shape (a concave shape as viewed from one side and a convex shape as viewed from the other side), or as rectangular projections diametrically provided on the main surface of the disc 25, each being cut and raised from the disc 25, except one side.

These fins 37 serve for ventilation of the disc 25 or for radiation of Joule heat caused by the eddy current transmitted from the disc 25 so that the temperature on the surfaces of the disc 25 may be maintained in the vicinity of the normal temperature (15° to 18° C. in the embodiment) to prevent the brake torque from being lowered by increase of the temperature.

As described in the foregoing, the present invention makes it possible to generate eddy current efficiently in the rotating disc and to obtain intense brake torque with a small-sized eletromagnet, since the electromagnet is disposed in a manner where the main surfaces of the rotating disc are inserted therein.

Further, in a preferred structure only one electromagnet, and therefore only one coil as the exciting coil are needed and accordingly, brake torque can be easily regulated by the current control.

If the present invention is applied in an ergometer, brake torque can be maintained constant with the rotation speed of the crankshaft by the pedals being in a practically applicable range in the speed increasing mechanism and as a result, the same load as if in the case of riding on a bicycle on the flat ground can be applied to the user and he will have a comfortable feeling at the time of using such an ergometer.

Further, the kinetic amount (work amount) of the user, which is represented by the product of the revolutions per minute of the crankshaft and the brake torque, can be calculated easily since the brake torque is constant.

In addition, since the brake torque can be set to an arbitrary fixed value, the present invention makes it possible to provide a device by which the user can exercise according to his physical strength.

While I have shown and described a presently preferred embodiment of the present invention, it will be understood that modifications can be made therein without departing from the spirit of the invention.

What is claimed:

1. An exercise device comprising a load applying means for applying load to a load shaft in said exercise device, which load shaft is adapted to rotate at a speed higher than a prescribed rotation speed, comprising:
   a frame for rotatably supporting said load shaft, including means for supporting a user.
   means operated by the user for rotating said load shaft.
   a rotating disc coupled to said load shaft so as to be rotated therewith, and
   an electromagnet disposed adjacent said rotating disc in a position where main surfaces of said rotating disc are inserted in said electromagnet, but are not in contact therewith, so that magnetic flux transversing the surfaces of said rotating disc is generated to apply brake torque to said rotating disc, whereby generated eddy current is utilized in a saturated region and stable brake torque is applied irrespective of the rotating speed of the load shaft, said electromagnet comprising a core and an exciting coil wound on said core and control means for controlling the current applied to said coil, wherein said control means comprises torque setting means and calculating means for calculating the necessary quantity of current to apply as control torque the torque set by said setting means whereby the quantity of current applied to said coil is regulated by said control means to change the brake torque applied to said disc.

2. A load applying means as set forth in claim 1, wherein said core being in the form of the letter C and being disposed in a manner where said main surfaces of said rotating disc are interposed in an opening formed between opposed end surfaces of said core.

3. A load applying means as set forth in claim 1, wherein a cut core is used as said core of said electromagnet.

4. A load applying means as set forth in claim 1, wherein said rotating disc is provided with fins for radiation of heat.

5. A load applying means as set forth in claim 1, wherein, said means operated by said user includes a crankshaft having pedals, and a speed increasing mechanism provided in association with said crankshaft and said load shaft for increasing the rotating speed of said crankshaft to transmit said increasing rotating speed to said load shaft, a speed increase ratio at the time of transmission being selected so that the rotation speed of said load shaft may be higher than said prescribed rotation speed with the rotation speed of said crankshaft being in the range of a practically applicable speed.

6. A load applying means as set forth in claim 5, wherein said core being in the form of the letter C and being provided in a manner where said main surfaces of said rotating disc are interposed in an opening formed between opposed end surfaces of said core.

7. A load applying means as set forth in claim 6, wherein a cut core is used as the core of said electromagnet.

8. A load applying means as set forth in claim 7, wherein said rotating disc is provided with a weight ring so that said rotating disc rotates with inertia.

9. A load applying means as set forth in claim 5, wherein said speed increasing mechanism is so constructed that increase of speed is made at a plurality of stages.

10. A load applying means as set forth in claim 9, wherein a motion transmitting mechanism comprising a chain and a gear is included in said speed increasing mechanism.

11. A load applying means as set forth in claim 9, wherein a motion transmitting mechanism comprising a belt and a rotating body is included in said speed increasing mechanism.

12. A load applying means as set forth in claim 9, wherein a combination of a first stage motion transmitting mechanism comprising a chain and a gear and a second stage motion transmitting mechanism comprising a belt and a rotating body are adopted in said speed increashing mechanism.

13. A load applying means as set forth in claim 1, wherein said calculation being based on the relation:

$$\text{torque} = k_2 + f(I)$$

where $K_2$ is a prescribed load value independent of current and $f(I)$ is a load value changing depend on current.

14. A load applying means as set forth in claim 5, wherein said rotating disc is provided with fins for radiation of heat

* * * * *